United States Patent [19]

Flint, III

[11] Patent Number: 4,821,307

[45] Date of Patent: Apr. 11, 1989

[54] IMAGE SPLITTER FOR TWO-WAY IMAGING APPARATUS

[76] Inventor: Paul L. Flint, III, 1001B Daniel Ct., Arlington, Va. 22201

[21] Appl. No.: 13,084

[22] Filed: Feb. 10, 1987

[51] Int. Cl.[4] ............... H04N 7/14; G02B 1/10; G02B 27/14

[52] U.S. Cl. ................... 379/53; 358/226; 350/601

[58] Field of Search ............ 379/53, 54; 358/85, 358/225, 226, 250; 350/601, 169; 354/110

[56] References Cited

U.S. PATENT DOCUMENTS

| | | | |
|---|---|---|---|
| 1,870,702 | 8/1932 | Zworykin | 358/85 |
| 2,017,883 | 10/1935 | Zworykin | 358/85 |
| 2,420,198 | 5/1947 | Rosenthal | 358/85 |
| 2,663,218 | 12/1953 | Ranseen | 350/601 X |
| 3,525,807 | 8/1970 | Herriott et al. | 358/85 |
| 3,567,848 | 3/1971 | Thies | 379/53 |
| 3,755,623 | 8/1973 | Cassagne | 358/85 |
| 3,816,654 | 6/1974 | Brightman | 358/85 X |
| 3,843,835 | 10/1974 | Mosca et al. | 358/85 X |
| 4,018,519 | 4/1977 | Clapp | 354/110 X |
| 4,054,908 | 10/1977 | Poirier et al. | 358/85 |
| 4,258,387 | 3/1981 | Lemelson et al. | 358/85 |
| 4,400,724 | 8/1983 | Fields | 358/85 |
| 4,400,725 | 8/1983 | Tanigaki | 358/85 |
| 4,491,868 | 1/1985 | Berridge, Jr. et al. | 358/226 X |
| 4,516,156 | 5/1985 | Fabris et al. | 358/85 |
| 4,653,875 | 3/1987 | Hines | 350/169 X |
| 4,686,698 | 8/1987 | Tompkins et al. | 379/53 |

FOREIGN PATENT DOCUMENTS

| | | | |
|---|---|---|---|
| 1916006 | 10/1970 | Fed. Rep. of Germany | 358/225 |
| 3431902 | 3/1986 | Fed. Rep. of Germany | 358/85 |
| 59-155823 | 9/1984 | Japan | 350/601 |

OTHER PUBLICATIONS

Horitake et al, "New Model Video Telephone Set Design," *Review of the Electrical Communication Laboratories*, (Japan), vol. 25, No. 1–2, Jan.–Feb. 1977, pp. 61–70.

John E. Tyson, "CLI Unveils Desktop Videoconferencing System," *Teleconference*, vol. 5, No. 6, Nov./Dec. 1986, pp. 39–41.

Behavioral Research Methods & Instrumentation, Feb. 1978, vol. 10 (1), 25–26, "A Device That Provides An Eye-To-Eye Video Perspective For Interactive Television," A. Rodney Wellens, University of Miami, Coral Gables, FL 33124.

*Primary Examiner*—Keith E. George
*Attorney, Agent, or Firm*—Neuman, Williams, Anderson & Olson

[57] ABSTRACT

A pair of devices is provided of similar construction. Each device includes a beam-splitter, a CRT for providing an image from the remote device and a TV camera to send an image to the remote device. The image from the CRT is viewable by a person using the device at all times. The TV camera will sense and send an image either of a person using the device or an item to be viewed. A pair of selectively operable light sources are provided to illuminate either the person or the item. If the person is illuminated, the TV camera transmits an image of the person. If the item is illuminated, the TV camera transmits an image of the item. A sound system is provided for audio communication. Computer means may be provided for controlling operation of the device.

7 Claims, 2 Drawing Sheets

IMAGE SPLITTER FOR TWO-WAY IMAGING APPARATUS

BACKGROUND OF THE INVENTION

The invention relates to a teleconferencing device wherein a pair of such devices enables two persons located at a distance from one another to communicate with one another so that each one can both see and hear the other in much the same manner as if they were face to face in the same room.

It is important that direct eye-to-eye contact is made between the two persons, and accordingly, it is important that when a user is viewing an image along an optical path from a remote teleconferencing device, the image of the user transmitted to the remote device be sensed along that same optical path. It is often desired to transmit an image of an item to be viewed in addition to the image of a person, and accordingly, it is desirable to provide means to do so in an economic and unobtrusive manner.

U.S. Pat. No. 3,755,623 discloses a combined television camera and television receiver unit for transmitting images of either a person or a document to be viewed. In the patented construction, mechanical means must be moved from one position to another in order to change from the transmission of an image of a person to the transmission of an image of a document and vice versa. Such movable mechanical means are relatively expensive to manufacture and are subject to failure during operation.

A further problem with a device such as shown in the aforementioned U.S. patent is that the CRT utilized therein may be oriented such that undesirable electromagnetic radiation such as radio frequency and X-ray emissions are directed at the user.

SUMMARY OF THE INVENTION

The present invention employs a beam-splitter and a CRT which directs an image from a remote teleconferencing device onto one side of the beam-splitter, such image being reflected to a user facing the device. A TV camera transmits either an image of the user which passes through the beam splitter or an image of an item to be viewed which is reflected off the opposite side of the beam-splitter. An optical switching means is provided in the form of a beam-splitter and an illuminating means which selectively illuminates either a person or an item to be viewed. The illuminating means may take the form of a pair of light sources which are energized alternately. If the person is illuminated, an image of the person is transmitted. If an item to be viewed is illuminated, an image of the item is transmitted.

The item, illustratively, takes the form of a document or the like, but may also be any three dimensional object whose image is to be transmitted to a remote location.

The invention eliminates the provision of movable mechanical parts as employed in the prior art to select the image to be transmitted, and accordingly provides a device which is relatively inexpensive to manufacture and reliable in operation.

Focusing means is provided in the form of an automatic or manually operated optical focusing lens for ensuring that the image of an item to be viewed is properly focused for transmission to a remote device.

In order to ensure effective eye-to-eye contact with users of different height, means is provided for adjusting the position of the sensing means relative to a user so that the operating axis of the sensing means is aligned with the eyes of the user.

The CRT image display means is located such that the operating axis thereof is disposed at substantially right angles to the path of a user's image passing through the device so that any undesirable radiation from the CRT is directed away from the user thereby eliminating any danger from such radiation.

The invention contemplates the provision of computer means for controlling operation of the device, and also provides a sound system to provide audio communication.

DESCRIPTION OF THE PREFERRED EMBODIMENTS

Figure 1:
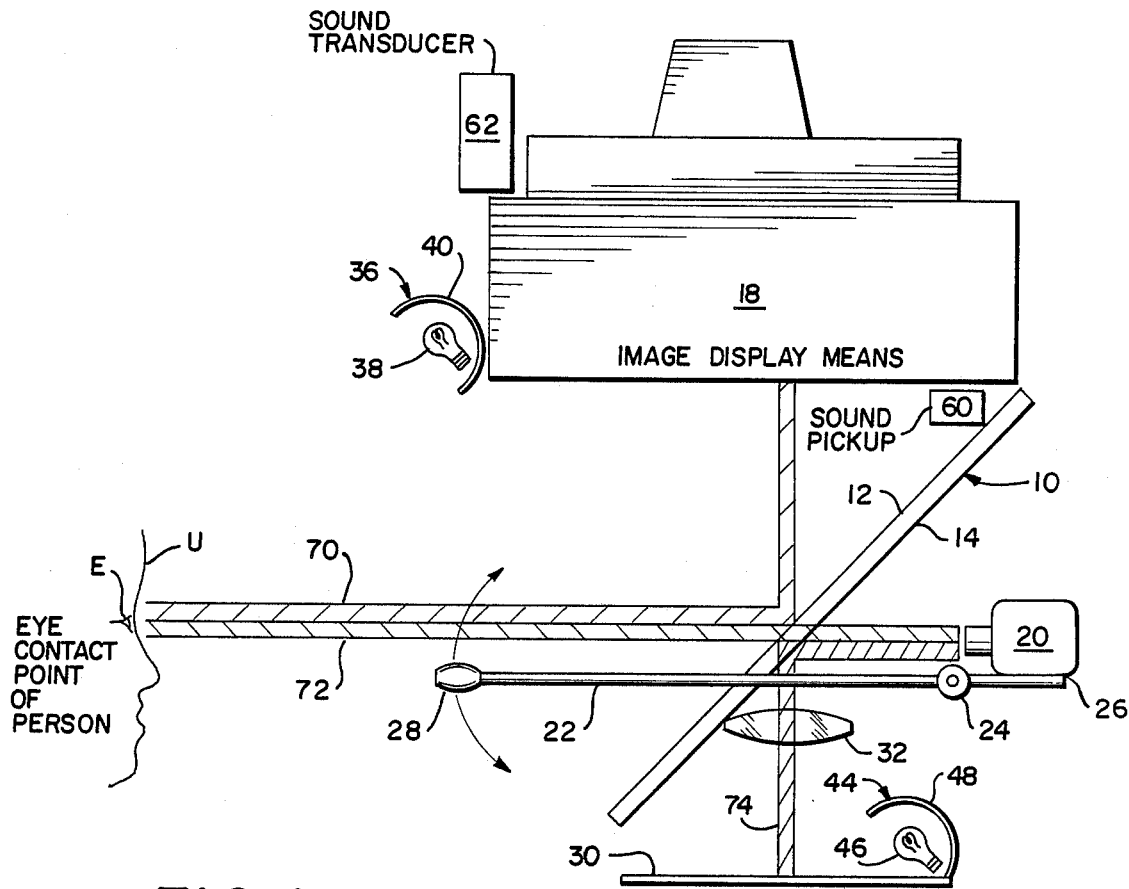
FIG. 1 is a schematic view of the teleconferencing device of the present invention.

Referring now to the drawings wherein like reference characters designate corresponding parts throughout the several views, there is shown in FIG. 1 in a schematic manner a teleconferencing device including an image directing means in the form of a beam-splitter means indicated generally by reference numeral 10 and having opposite substantially planar parallel sides 12 and 14. The beam-splitter is of conventional construction and typically may comprise a sheet of glass having two thin films of dielectric material deposited on the surfaces thereof so as to divide an incident beam into two parts in a well-known manner. A multilayer arrangement is used so that the beam-splitter serves as a filter so as to reflect from substantially only one side thereof. The beam splitter 10 is comprised of ¼" flint or plate glass as normally used in building windows. Upon surface 12 is vacuum deposited an aluminum layer of molecular thickness such that this surface partially reflects light and partially passes or transmits light. Upon surface 14 is deposited a coating of magnesium fluoride which attenuates both the reflection characteristics of the surface 14 and the transmission characteristics of the glass. The final glass plate has a light attenuation therethrough of approximately 40%, a reflection percentage on side 12 of approximately 30% and a reflection percentage on side 14 of approximately 0.5%. Furthermore, the beam-splitter is adapted to reflect beams in the visible light region of the spectrum, while not reflecting beams in the radio frequency or x-ray regions of the spectrum.

An image display means 18 in the form of a conventional television monitor or CRT is disposed at one side 12 of the beam-splitter and has an operating axis X-X which is inclined at substantially 45 degrees relative to the plane of side 12. An image sensing means 20 in the form of a conventional television camera is disposed at the other side 14 of the beam-splitter and has an operating axis Y-Y which is inclined at substantially 45 degrees relative to the plane of side 14. The sensing means 20 may illustratively take the form of a camera model WV F-2 as manufactured by Matsushita. It is noted that if the operating axes of the image display means and the image sensing means were continued to a point where they intersect, the beam splitter passes through such point of intersection.

An adjusting means is provided for adjusting the position of the sensing means 20 relative to a person to be viewed by the sensing means and comprises an elongated lever 22 pivoted about a point 24 and being connected to the sensing means at point 26. The opposite end of the lever is provided with a knob 28 which may be manually grasped by a user and adjusted so that the operating axis of the sensing means is directly aligned with the eyes of the user.

A supporting means for supporting an item to be viewed such as a document is provided and comprises a plate 30 disposed at the other side 14 of the beam splitter, the plate being formed of clear plastic or glass and the like so as to be transmissive to the radiation (light) reflected by the document. A document may be placed to face upward on the plate when it is desired to transmit an image of the document.

A focusing means is provided for focusing the image of a document or the like so that a sharp image is transmitted by the sensing means. The focusing means comprises a lens 32 which may be manually or automatically adjusted in a well-known manner so as to properly focus the image transmitted by the sensing means.

A first illuminating means 36 may be of any known construction and is shown as comprising a conventional light bulb 38 and a reflector 40. This illuminating means is employed for brightly illuminating a user indicated by reference character U whose eyes are indicated by reference character E.

A second illuminating means 44 includes a light bulb 46 and a reflector 48. The second illuminating means 44 is employed for brightly illuminating a document or the like supported on plate 30.

It is noted that the two illuminating means are positioned such that they are adapted to illuminate a user at one side of the beam-splitter or a document at the other side of the beam splitter, the illuminating means being alternately energized as hereinafter described.

Figure 2:
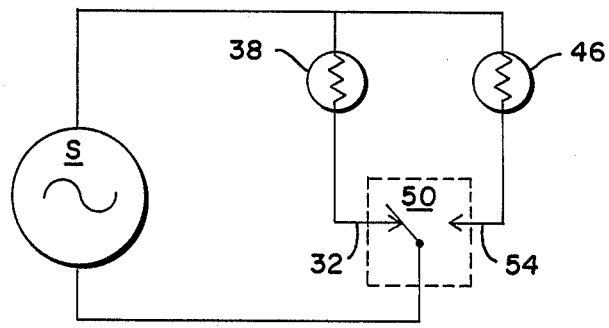
FIG. 2 is a schematic wiring diagram of an electrical circuit used with the device shown in FIG. 1.

Referring now to FIG. 2 of the drawings, a conventional power source S such as house current is connected in parallel with the light bulbs 38 and 46, a single pole double throw switch 50 being provided for alternately engaging contact 52 or 54 for energizing bulbs 38 or 46 respectively.

Referring again to FIG. 1, sound pickup means 60 such as a microphone and a sound transducer 62 such as a loudspeaker are disposed such that the pickup means is adapted to pick up the voice of a user and the sound produced by the loudspeaker is heard by the user. In this manner, audio as well as a visual communication is provided between the teleconferencing device shown in FIG. 1 and a similar teleconferencing device disposed remotely and connected thereto by a signal transmission means such as conventional telephone lines, microwave lines or a broad band LAN.

It is understood that any suitable means may be provided for supporting the elements shown in FIGS. 1 and 2 in operative relationship relative to one another.

In operation of the device, the image display means 18 provides an image which is transmitted along light path 70 and is reflected by surface 12 of the beam-splitter and directed therefrom to the eyes E of the user U. The user will thereby be provided with an image transmitted by the remote device at all times during operation. When it is desired to transmit an image of the user U, illuminating means 36 is energized by moving switch 50 into engagement with contact 52 so that light bulb 38 is lit. This serves to brightly illuminate the user U such that his image is transmitted along light path 72 through the beam splitter 10 and is sensed by the sensing means 20 taking the illustrative form of a TV camera tube which generates electrical signals in a well-known manner to be transmitted to a remote device and thence converted into an image on the image display means of a remote device in the usual manner.

When it is desired to transmit the image of a document or the like, switch 50 is moved so as to engage contact 54 whereby light bulb 38 is extinguished and light bulb 46 is energized. A document resting on plate 30 is then brightly illuminated, while the user U is no longer illuminated. The image of the document is transmitted along light path 74 and is reflected off of surface 14 of the beam splitter 10 and directed to the sensing means 20. Since the image of the document is brightly illuminated while the user U is no longer illuminated, the sensing means will sense the image of the document rather than the image of the user, and the image of the document is therefore transmitted to a remote device.

The ratio of the light reflected from the selected image to be transmitted versus the light reflected from the nonselected image is maintained at a contrast ratio of approximately 7:1. This contrast ratio provides the illusion of switching the image. In order to direct an image of the user U or the document and to maintain this contrast ratio, the ratio of lighting in the system is modified to favor one or the other of these two images. The sensing means 20 principally gathers light generated by one of the two light bulbs 46 or 38. This light is reflected off of either the user or the document disposed on the plate 30. If bulb 38 is on and the bulb 46 is extinguished, then very little light is emitted from objects placed on plate 30, while the light emitted from bulb 38 reflects off the user U, passes through the beam splitter 10 and is captured by the sensing means 20. Conversely, if bulb 38 is extinguished and bulb 46 is powered on, then this light reflects from the document on plate 30, reflects off the beam-splitter 10 and is the predominant light source picked up by the sensing means 20. The user U is now illuminated only with ambient light.

The partially aluminised side 12 of the beam-splitter 10 is used to reflect the image from the display means 18 in the following manner. The light generated by the phosphor of the display means is directed away from the monitor until it reaches the front surface 12 of the beam-splitter 10. It is at this point reflected partially and passes into the eyes of the user U.

The antireflective coating is placed upon the surface 14 of the beam-splitter 10 to eliminate a double image which would otherwise be generated when viewing a document due to the low ratio of reflectivity to transmission. In the beam-splitter surface, the reflection generated by a clear surface is about 5%. This creates a significant image at the sensing means 20. The antireflective coating illustratively of magnesium fluoride attenuates the reflection off this surface 14 by a factor of 10, at a very slight cost in transmitivity.

It is apparent from the above description of the operation of the device that the image to be transmitted to a remote device is determined by optical switching means including illuminating means which can be selectively operated so as to illuminate either a user or an item to be viewed, the sensing means in each case sensing only that which is brightly illuminated by the illuminating means.

The ratio of transmission through the beam splitter 10 versus the reflection of light orthogonally to the beam-splitter is approximately 4:3. This relates to the amount of light which may be directed at the user U before physical or psychological discomfort occurs. The user illumination from bulb 38 must be kept below a relatively low comfort level. Thus, the path of greatest transmittability with respect to the sensing means 20 is in path 72. The reflection factor of 30% toward both the document on one side 14 and the other side 12 is compensated for by a greater intensity of illumination from bulb 46, e.g. by as much as a factor of 10, with respect to the illumination from bulb 38. This greater intensity poses no burden to the document being viewed. This great intensity of reflected light arriving from the document at the sensing means 20 effectively masks any ambient light reflected from the user U.

Figure 3:
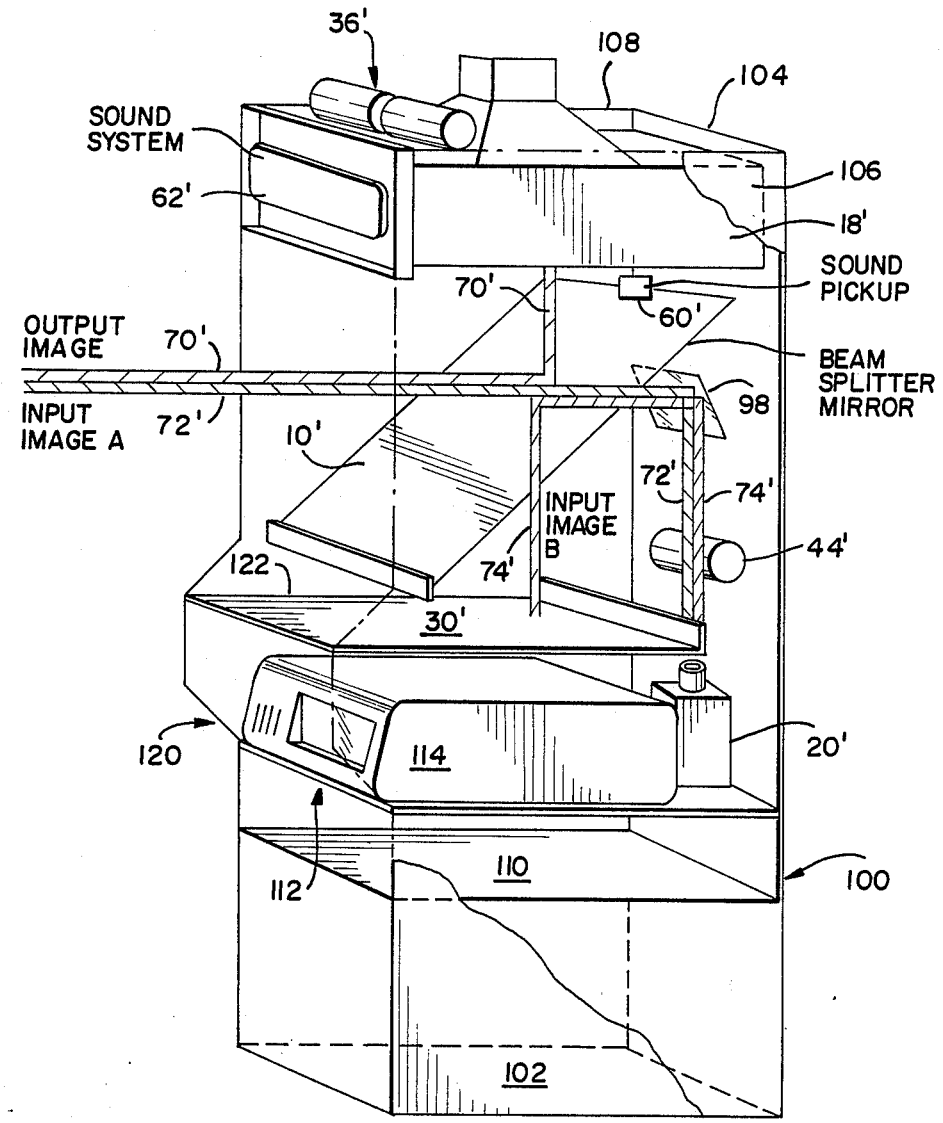
FIG. 3 is a somewhat schematic isometric view of an office unit according to the invention.

Referring now to FIG. 3 of the drawings, an office unit 100 is illustrated wherein components corresponding to the components shown in FIG. 1 have been given the same reference numerals primed. In this construction, the image display means 18' is disposed above the beam-splitter 10' and the image sensing means 20' is positioned such that the operating axis thereof is vertical or parallel with the operation axis of the image display means. A reflecting mirror 98 is disposed so that paths 72' and 74' are directed to the sensing means by being reflected off of mirror 98.

A base 102 may be mounted on wheels to facilitate movement thereof, a back wall 104 and a pair of side walls 106 and 108 being supported by the base. The upper surface 110 of the base may be used for supporting the keyboard of a suitable computer such as a conventional personal computer now on the market. Of course, other items may also be supported on such upper surface. A shelf 112 supports the personal computer controller 114 which in turn is connected with a color monitor forming the image display means 18'.

A pair of inclined members 120 and 122 are supported by the base, member 122 being adjacent the support plate 30' which need not be transparent. The document or other item is placed face up on the plate 30', and illumination means 44' is adapted to brightly illuminate same when it is desired to transmit an image thereof.

Mirror 98 is supported on the back wall 104, and the beam-splitter 10' is supported between side walls 106 and 108. The image display means 18' is supported by the walls at the top of the unit, and illumination means 36' is mounted at the top of the unit so as to brightly illuminate a user positioned in facing relation to the unit. Sound pickup means 60' and sound transducer means 62' are supported at the upper front of the unit.

The computer is connected to the image display means for controlling the operation thereof in a conventional manner. This permits graphic data to be transmitted from one teleconferencing device to another. It is of course understood that the computer may also control the circuit shown in FIG. 2 of the drawings so that operation of the various components of the device may be suitably synchronized.

The operation of the unit 100 is substantially the same as that discussed in connection with FIGS. 1 and 2, the same principles being employed in that optical switching means is provided for selectively transmitting the image of the user or of a document and the like depending on which is brightly illuminated by the illumination means of the device.

A focusing means may also be employed in the unit 100 for focusing the image of a document or the like if so desired. The manual adjustment of the focusing lens 32 in FIG. 1 eliminates the necessity of adjusting the focus of the TV camera when switching from the transmission of the image of a user to the transmission of the image of a document.

The provision of the optical switching means of the present invention eliminates the necessity of providing movable mechanical parts as employed in the prior art. The focusing means enables the image of a document to be properly focused for transmission to a remote device. Effective eye-to-eye contact with users of different height is ensured by use of the adjusting means of the invention.

It should be noted that the display means is so disposed that the operating axis thereof is disposed at substantially right angles to the path of a user's image passing through the device so that any undesirable radiation traveling along the operating axis of the display means will be directed away from the user.

The office unit of the invention provides an integrated unit which may be disposed in a selected position within an office. A complete audio, video data and graphics capability is built into a unit of relatively compact size. A pictographic security record of operators may be, and the unit may also be used as a component in teleproduction or a newsgathering environment.

The sound components of the device may be positioned so as to complement the positioning of the human ears and mouth, and the lighting produced by the illumination means may be done in a tasteful and unobtrusive fashion. The device attenuates the undesirable electromagnetic radiation output without attenuating the light output significantly.

The invention has been described with reference to preferred embodiments. Obviously, modifications, alterations and other embodiments will occur to others upon reading and understanding this specification. It is my intention to include all such modification, alterations and alternate embodiments insofar as they come within the scope of the appended claims or the equivalent thereof.

I claim:

1. Apparatus for generating selectively a manifestation indicative of a first or second image, comprising:
    (a) image sensing means to receive one of said first and second images to provide a corresponding manifestation thereof;
    (b) means for illuminating selectively one of said first and second images, said illuminating means illuminating said second image with a greater intensity than said first image; and
    (c) an image splitter disposed between said first and second images for selectively directing along a first path one of said first and second images depending upon which is illuminated by said illuminating means, said image splitter having a first surface for receiving via a second path incident therewith said first image an for transmitting said first image therethrough to be directed along said first path onto said image sensing means, and a second surface for receiving said second image along a third path incident therewith and for reflecting said second image along said first path onto said image sensing means, said image splitter having the property of a higher transmission of said first image therethrough than reflection of said second image.

2. The image generating apparatus as defined in claim 1, wherein said illuminating means includes a pair of light sources.

3. The image generating apparatus as defined in claim 2, wherein one of said pair of light sources is disposed adjacent said first surface of said image splitting and the other of said pair of light sources is disposed adjacent said second surface of said image splitter.

4. The image generating means as claimed in claim 2, wherein there is included means for selectively energizing said one of said pair of light sources, whereby the corresponding one of said first and second images is directed onto said image sensing means.

5. Apparatus for generating selectively a manifestation indicative of a first or second image, comprising:
   (a) an image splitter having first and second surfaces and disposed between said first and second images for receiving said first and second images via first and second paths respectively and for selective directing along a third path one of said first and second images depending upon the intensity of its illumination;
   (b) image sensing means disposed in said third path to receive the selectively directed image to provide a corresponding manifestation;
   (c) means for illuminating selectively one of said first and second images with an illumination of greater intensity whereby said selected one image is transmitted to said image sensing means; and
   (d) display means for projecting a third image along a fourth path intersecting said first surface;
   (e) said image splitter comprising a radiation transmissive layer defining said first and second surfaces, said first surface having a reflective coating thereon and said second surface having an antireflective coating thereon, said third image being incident via said fourth path upon said reflective coating to be reflected thereby via said first path, said second image being directed via said second path through said second surface and said transmissive layer to be incident upon said reflective coating to be reflected thereby via said first path onto said image sensing means, said antireflective coating preventing substantially the reflection of a double second image onto said image sensing means.

6. The image generating apparatus as claimed in claim 5, wherein said first coating comprises aluminum.

7. The image generating apparatus as claimed in claim 5, wherein said second coating comprises magnesium fluoride.

* * * * *